A. J. JOURDE.

Improvement in Car-Couplings.

No. 128,047. Patented June 18, 1872.

Witnesses:
E. Wolff
H. A. Graham

Inventor:
Alfred J. Jourde.
PER
Attorneys.

UNITED STATES PATENT OFFICE.

ALFRED J. JOURDE, OF HOUSTON, TEXAS.

IMPROVEMENT IN CAR-COUPLINGS.

Specification forming part of Letters Patent No. 128,047, dated June 18, 1872.

Specification describing a new and useful Improvement in Car-Coupling, invented by ALFRED J. JOURDE, of Houston, in the county of Harris and State of Texas.

Figure 1:
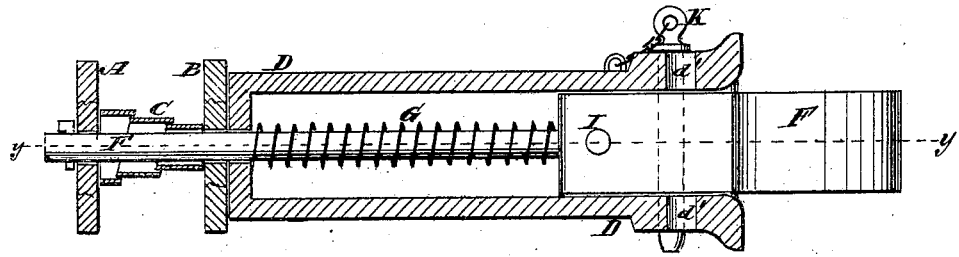
Figure 2:
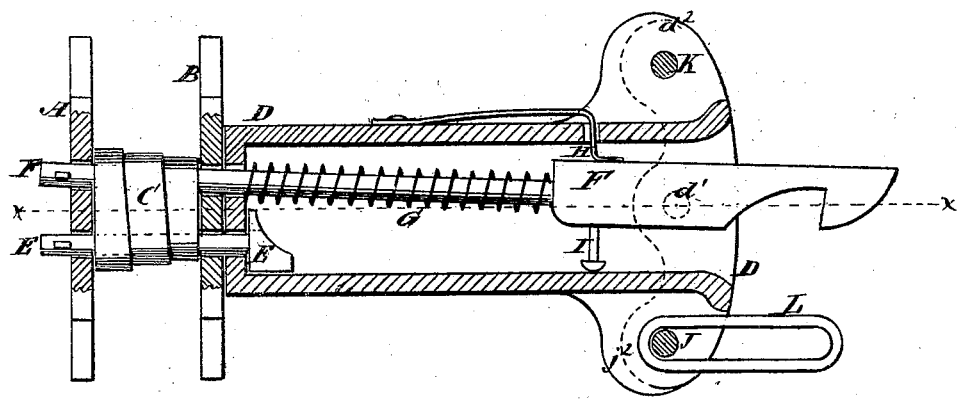

Figure 1 is a vertical longitudinal section of my improved car-coupling taken through the line $x\,x$, Fig. 2. Fig. 2 is a horizontal longitudinal section of the same taken through the line $y\,y$, Fig. 1.

Similar letters of reference indicate corresponding parts.

My invention has for its object to furnish an improved car-coupling which shall be so constructed as to couple the cars automatically as they are run together, to hold them securely coupled when upon the track, and to uncouple them automatically should one or more of the cars run off the track or capsize; and it consists in the construction and combination of the various parts of the coupling, as hereinafter more fully described.

A and B are two plates, which are connected with the dead-wood of the car, and between which is placed the concussion-spring C. D is the bumper-head, which is connected with the forward plate B. E is a pin, which is made with a head upon one end and an eye in the other end. The pin E is passed through a hole in the end of the bumper-head D, through a hole in the plate B, through the concussion-spring C, through a hole in the plate A, and is secured in place by a key passed through the eye in its end, as shown in Fig. 2. The pin E is designed to receive the draft when the coupling is made with the ordinary coupling link and pin. F is the coupling-bar, which is made with a hook upon the side of its forward end to take hold of a similar hook of the bumper-head of another car when the cars are run together. The inner part of the bar F is made in the form of a rod, and passes through a hole in the end of the bumper-head D, through a hole in the plate B, through the concussion-spring C, through a hole in the plate A, and is secured in place by a key, as shown in Figs. 1 and 2. The round part of the hook-bar F is made long, so that the hook can be pushed back into the bumper-head when it is desired to couple with the link and pin. The hooked end of the bar F is held out by a coiled spring, G, placed upon its inner or rounded part. The hooked bar F is held in the middle part of the bumper-head by a spring, H, attached to the side of the bumper-head D, and which presses against the side of the coupling hook-bar F. The hooked bar F may be kept from being pushed too far over by a stop-pin, I, attached to it, and which strikes against the side of the bumper-head.

The uncoupling is done by a lever inserted in the hole $d^1$ in the middle part of the bumper-head and pulling in the proper direction, which detaches the hooks from each other. The hooks F may be held in the uncoupled position by dropping the end of the uncoupling-lever into the hole through the bottom of the bumper-head D.

Upon the sides of the bumper-head D are formed lugs $d^2$, having holes formed through them to receive the coupling-pins J K, from one of which may be suspended the coupling-link L. The coupling pins and link may be used should any accident happen to the hook-coupling.

Having thus described my invention, I claim as new and desire to secure by Letters Patent—

An improved car-coupling, composed of the plates A B, concussion-spring C, bumper-head D, pin E, coupling hook-bar F, coiled spring G, and side spring H, said parts being constructed and arranged substantially as herein shown and described, and for the purpose set forth.

ALFRED JOHN JOURDE.

Witnesses:
    JAMES JOHN MARTIN,
    SETH ORLANDO LESSER.